(12) United States Patent
Harris

(10) Patent No.: US 6,671,668 B2
(45) Date of Patent: Dec. 30, 2003

(54) SPEECH RECOGNITION SYSTEM INCLUDING MANNER DISCRIMINATION

(75) Inventor: Robert Harris, Christchurch (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/326,748

(22) Filed: Dec. 20, 2002

(65) Prior Publication Data
US 2003/0088409 A1 May 8, 2003

Related U.S. Application Data

(63) Continuation of application No. 09/401,683, filed on Sep. 22, 1999.

(30) Foreign Application Priority Data

Mar. 19, 1999 (GB) .............................................. 9906253

(51) Int. Cl.⁷ .............................................. G10L 17/00
(52) U.S. Cl. ...................... 704/246; 704/235; 704/252
(58) Field of Search ................................ 704/235, 251, 704/256, 270, 275, 246; 379/88.01

(56) References Cited

U.S. PATENT DOCUMENTS

| | | | |
|---|---|---|---|
| 4,707,858 A | * 11/1987 | Fette | 704/251 |
| 5,193,142 A | 3/1993 | Zhao | 704/200 |
| 5,228,087 A | * 7/1993 | Bickerton | 704/232 |
| 5,553,119 A | * 9/1996 | McAllister et al. | 379/88.01 |
| 5,734,794 A | * 3/1998 | White | 704/275 |
| 5,790,033 A | * 8/1998 | Yamamoto | 340/573.1 |
| 5,870,709 A | * 2/1999 | Bernstein | 704/275 |
| 6,006,188 A | * 12/1999 | Bogdashevsky et al. | 704/270 |

FOREIGN PATENT DOCUMENTS

| | | | |
|---|---|---|---|
| EP | 0 470 411 A2 | 2/1992 | G10L/3/00 |
| EP | 0 642 117 A2 | 3/1995 | 704/256 |
| GB | 2 305 288 A | 4/1997 | 704/256 |
| WO | WO 96/25733 | 8/1996 | 704/233 |
| WO | WO 98/41977 | * 9/1998 | 704/270 |

OTHER PUBLICATIONS

Wightman, C. W. and M. Ostendorf, "Automatic Labeling of Prosodic Patterns," IEEE Trans. Speech and Audio Proc., vol. 2, iss. 4, Oct. 1994, pp. 469–481.*

Arthur Goldstuck, "Make my Day: Lie to me"—http://www.truster.com/pages/pr.html, Jun. 22, 1998.

Press Release "Trustec Innovative Technologies Ltd. announces Trusterpro" —wysiwyg://main.12/http://www.truster.com/pages/tpro–pr.html, Sep. 15, 1998.

* cited by examiner

Primary Examiner—Richemond Dorvil
Assistant Examiner—Donald L. Storm
(74) Attorney, Agent, or Firm—Thu Ann Dang

(57) ABSTRACT

A speech recognition system is trained to be sensitive not only to the actual spoken text, but also to the manner in which the text is spoken, for example, whether something is said confidently, or hesitatingly. In the preferred embodiment, this is achieved by using a Hidden Markov Model (HMM) as the recognition engine, and training the HMM to recognise different styles of input. This approach finds particular application in the telephony voice processing environment, where short caller responses need to be recognised, and the system can then react in a fashion appropriate to the tone or manner in which the caller has spoken.

24 Claims, 4 Drawing Sheets

SPEECH RECOGNITION SYSTEM INCLUDING MANNER DISCRIMINATION

CROSS-REFERENCE TO RELATED APPLICATIONS

This application is a continuation of pending U.S. application Ser. No. 09/401,683, filed Sep. 22, 1999, which is incorporated by reference herein.

BACKGROUND OF THE INVENTION

The present invention relates to speech or voice recognition systems, and more particularly to speech recognition systems for use in voice processing systems and the like.

Voice processing systems whereby callers interact over the telephone network with computerised equipment are very well-known in the art, and include voice mail systems, voice response units, and so on. Typically such systems ask a caller (or called party) questions using prerecorded prompts, and the caller inputs answers by pressing dual tone multiple frequency (DTMF) keys on their telephones. This approach has proved effective for simple interactions, but is clearly restricted in scope due to the limited number of available keys on a telephone. For example, alphabetical input is particularly difficult using DTMF keys.

There has therefore been an increasing tendency in recent years for voice processing systems to use voice recognition in order to augment DTMF input. The adoption of voice recognition permits the handling of callers who do not have a DTMF phone, and also the acquisition of more complex information beyond simple numerals from the caller.

As an illustration of the current art in the voice processing industry, WO96/25733 describes a voice response system which includes a prompt unit, a Voice Activity Detector (VAD), and a voice recognition unit. In this system, as a prompt is played to the caller, any from the caller is passed to the VAD, together with the output from the prompt unit. This allows the VAD to perform echo cancellation on the incoming signal. Then, in response to the detection of voice by the VAD, the prompt is discontinued, and the caller input is switched to the recognition unit, thereby providing a barge-in facility.

Voice recognition in a telephony environment can be supported by a variety of hardware architectures. Many voice processing systems include a special DSP card for running voice recognition software. This card is connected to a line interface unit for the transfer of telephony data by a time division multiplex (TDM) bus. Most commercial voice processing systems, more particularly their line interface units and DSP cards, conform to one of two standard architectures: either the Signal Computing System Architecture (SCSA), or the Multi-vendor integration Protocol (MVIP). A somewhat different configuration is described in GB 2280820, in which a voice processing system is connected via a local area network to a remote server, which provides a voice recognition facility. This approach is somewhat more complex than the TDM approach, given the data communication and management required, but does offer significantly increased flexibility.

Speech recognition systems are generally used in telephony environments as cost-effective substitutes for human agents, and are adequate for performing simple, routine tasks. It is important that such tasks are performed accurately otherwise there maybe significant customer dissatisfaction, and also as quickly as possible, both to improve caller throughput, and also because the owner of the voice processing system is often paying for the call via some FreePhone mechanism (e.g., an 800 number). With continuing improvements in recognition accuracy, the current generation of speech recognition systems are starting to be used in more and more complex situations, which have hitherto been the exclusive realm of human operators. Nevertheless, even with their impressive ability to recognise speech, such systems are still deficient at providing as complete a service to the caller as a human agent could provide.

It is also known to use lie detection technology on an audio signal over the telephone, in particular the TrusterPro product from Trustech Innovative Technologies Ltd. of Israel. However, this represents a relatively specialised approach, which does not appear to be directly compatible with those techniques used for speech recognition (therefore making integration more difficult).

SUMMARY OF THE INVENTION

Accordingly, the present invention provides a method of performing speech recognition comprising the steps of:

receiving acoustic spoken input;

processing said acoustic input by performing speech recognition to determine (i) a text equivalent; and (ii) a manner in which said spoken input was rendered; and performing a further operation, dependent on the manner in which said spoken input was rendered.

Thus the speech recognition system of the invention can discriminate between at least two of the different manners in which the same set of words are spoken, for example, confidently, hesitatingly, angrily, and so on. This manner information supplements the recognised text, to provide additional information about what is being communicated by the speaker. In contrast, prior art systems have provided only the plain text. Thus the present invention provides a more human-like capability for a recognition system, and therefore enhanced power in terms of comprehension and flexibility.

In the preferred embodiment, said processing step is performed using a Hidden Markov Model (HMM) as the basis for the recognition engine. The HMM can be trained to discriminate amongst a predetermined set of available manners, so that said processing step determines which manner from said predetermined set of available manners best corresponds to the manner in which said spoken input was rendered.

Preferably the spoken input comprises a single word, or possibly a short sequence of words. This considerably reduces the complexity of the overall recognition task, thereby rendering more practicable the discrimination according to manner, which is much more easily discerned in relation to a single word than to a whole phrase or sentence (training for a whole phrase would also be extremely difficult, given the wide variety of possible deliveries which would still correspond to the same basic emotion).

In the preferred embodiment, said processing step further comprises determining a confidence level associated with the recognition of the text equivalent. This confidence level determines how good is the match between the caller input and the recognition model. Note that this is not completely independent of manner, in that an utterance spoken in an unusual manner is likely to give rise to a low recognition confidence. Nevertheless, there is a clear difference between determination of confidence, which describes how well one model fits the caller input, and determination of manner, which effectively tries to determine which of multiple models best fits the caller input. (Note that it would be feasible to also provide a confidence estimate for the manner determination in addition to the text recognition).

The invention also provides a speech recognition system comprising:

means for receiving an acoustic spoken input; means for processing said acoustic input by performing speech recognition to determine (i) a text equivalent; and (ii) a manner in which said spoken input was rendered; and means for performing a further operation, dependent on the manner in which said spoken input was rendered.

In the preferred embodiment, such a speech recognition system is incorporated into a voice processing system which is connected to a telephone network, and said spoken input is received from a caller over the telephone network. In such an environment, the performing means comprises a voice processing application running on the voice processing system. This application can then move to a different part of a voice processing menu hierarchy, dependent on the manner in which said spoken input was rendered. For example, if a caller sounds confused or angry, the system may decide to transfer them to a human operator, rather than to otherwise continue through the application. Likewise, if a caller sounds as if he or she is in a particular hurry, the system may decide to process their call with a higher priority than otherwise.

The invention further provides a method of training a speech recognition system including a Hidden Markov model comprising the steps of:

collecting samples of acoustic spoken input data of a particular text;

marking for each sample the manner in which the text was spoken; and training the HMM to discriminate acoustic spoken input data according to the manner in which it is spoken.

A particular benefit of the invention is that it can be implemented with essentially existing recognition engines based on HMMs, but that these need to be trained to provide the appropriate discrimination of manner. In order to obtain the necessary input data, one possibility is to employ an actor to read text according to a predetermined set of different manners (e.g., with confidence, in anger, and so on). More realistic results may come however for voice processing applications from using real call data to train the system.

BRIEF DESCRIPTION OF THE DRAWINGS

An embodiment of the invention will now be described in detail by way of example only with reference to the following drawings.

DETAILED DESCRIPTION

Figure 1:
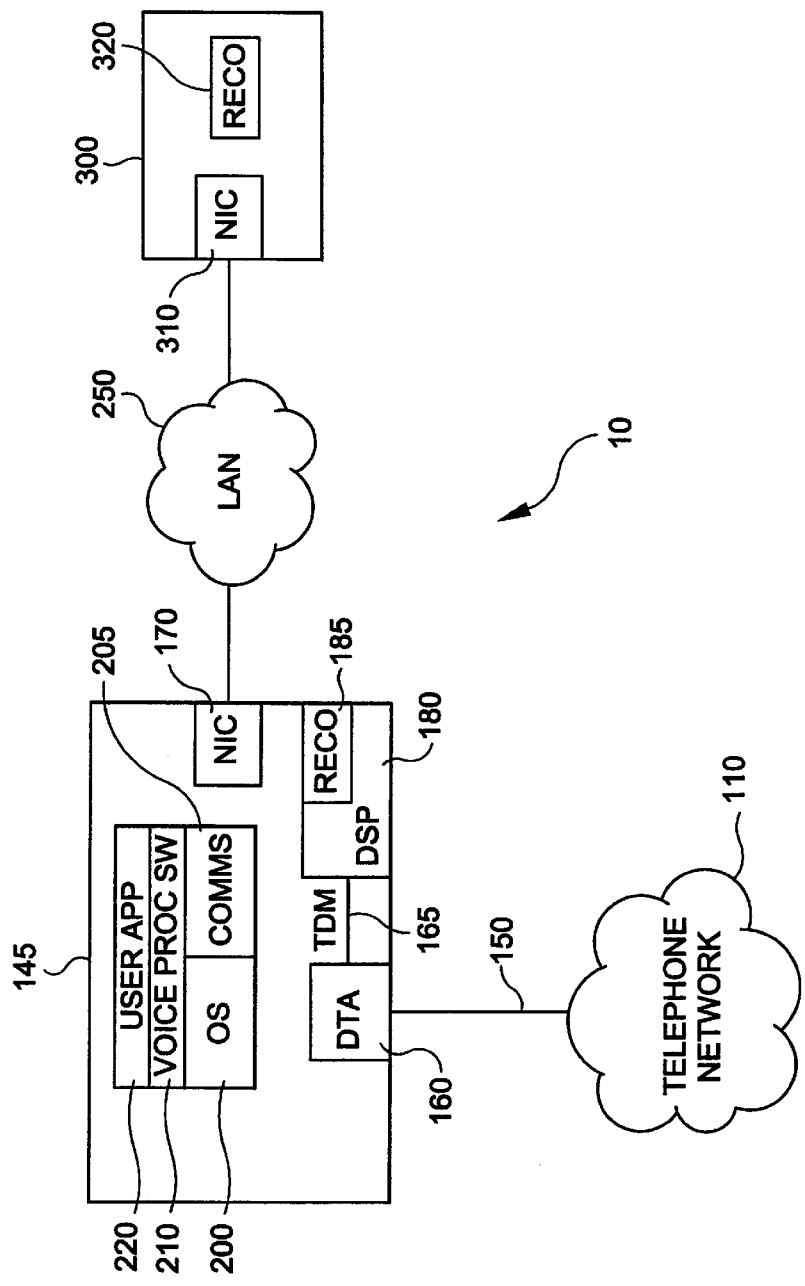
FIG. 1 is a simplified schematic diagram of a voice processing system connected to a remote server.

FIG. 1 illustrates in simplified schematic form the main hardware and software components of a voice processing system 10 having speech recognition functionality. The system 10 is connected to the telephone network 110 by one or more digital trunk lines 150, each carrying multiple telephony channels (T1 digital trunk lines in North America comprise 24 channels, E1 digital trunk lines in Europe comprise 30 channels). It will be appreciated that in some installations, the digital trunk lines may be connected to the telephone network 110 via a switch or PBX; indeed one possibility is for the voice processing system to effectively be a part of the telephone network itself, providing intelligent services to the network.

The system unit 145 of the voice processing system comprises a computer workstation, which runs an appropriate operating system 200 and a voice processing program 210, which in turn interacts with a user application 220 in order to determine how calls should be processed. The system unit includes one or more digital trunk adapter cards 160 for interfacing to the telephone network 110 via link 150. The system unit also contains a network interface card 170 which allows programs running on the workstation to communicate over a local area network (LAN) 250, using communications software 205 incorporated into the operating system. In addition, the system unit includes a digital signal processing (DSP) card 180, which is connected to the trunk adapter (or adapters) via a time division multiplex (TDM) bus 165. Speech recognition software 185 is installed on the DSP card.

The adapter cards 160 are responsible for interfacing with the telephone network over their respective lines, including signalling, demultiplexing incoming telephony signals, and so on. They may also be used to perform activities such as detection of voice activity on a particular telephony channel, compression/decompression of voice signals, and DTMF recognition, although these may be performed on the DSP card instead.

A server system 300 is attached to the LAN 250 via network interface card 310, and supports an operating system and appropriate communications software (not shown), and speech recognition software 320. It will be appreciated therefore that there are two voice recognition resources available to the application 220, the first of these being locally installed on the DSP card 180 in the system unit, and the second voice recognition resource being available remotely via the LAN 250 on server 300.

In one preferred embodiment, the voice processing system is the Corepoint voice response unit (previously known as the DirectTalk voice processing system) available from Corepoint Technologies, a division of IBM Corporation, running on an RS/6000 workstation on top of the AIX operating system. The TDM bus comprises an SCbus, and the DSP card comprises an Antares card, both available from Dialogic Corporation, New Jersey, USA.

It will be appreciated that there are many possible variations in the design of the voice processing system of FIG. 1. For example, some voice processing systems accept input from analog lines rather than digital trunks, whilst some voice processing systems package the DSP card 185 as a daughter card of the DTA 160, thereby eliminating the need for the TDM bus. The illustrated system also has access to both a server voice recognition system, and also to a local DSP recognition system, whereas many voice processing systems will have access to only one such resource. Further, any suitable network could be used for communications between the server and the voice processing system, providing it has suitable transmission characteristics in terms of bandwidth and latency (e.g., one possibility might be to use an ATM connection). In addition, although the voice processing system illustrated has just a single local DSP resource, some voice processing systems may include multiple DSP cards, with each card supporting multiple recognition programs running simultaneously. Moreover, although the server approach as shown has the recognition system installed on a separate machine from the line interface unit 160, it would clearly be possible for the software recognition system to be running or the same machine 145 as the line interface unit, provided this machine had sufficient processing capability. The skilled person will appreciate that such variations are not pertinent to the principles of the present invention.

A typical operation of the voice processing system of FIG. 1 is as follows. An incoming call is received over the telephony network 110, and the voice processing system 10, under the control of the user application 220, may determine that the caller does not have a DTMF telephone (this determination can be made for example through knowledge of the calling or called number, or by the caller failing to depress a tone key when requested to do so). In such circumstances (or possibly for all callers), the voice processing system elects to utilise voice recognition to interpret the caller's input. This is done by forwarding the appropriate audio signal to a speech recognition resource. For use of the local resource, this leads to a channel on the trunk adapter 160 being connected with a channel on the DSP card 180 via the TDM bus 165. Access to the remote resource can be achieved for example using the approach described in GB 2325110, which is incorporated herein by reference. (Note that the TDM bus connection as shown in FIG. 1 provides a uni-directional data flow, so that as is well-known in the art, a pair of such connections are needed to support a full duplex telephone conversation).

The speech recognition system processes the received audio signal, and returns the spoken string to the user application 220. It will be noted that the large majority of voice recognition systems used in telephony are speaker independent; in other words, such systems are trained to recognise vocal input from any speaker. This is accomplished by training the machine on vocal samples from as wide a range of speakers as possible. In general the recognition may also return other information in addition to the recognised string, for example, a statistical confidence level, possible alternative results, and so on. The user application will then further process the call in accordance with the returned recognition result. For example, if the caller has spoken a numerical sequence corresponding to an account number, it may then provide the caller with the ability to access account information; if the caller has spoken a particular name, it may transfer the caller to the telephone extension for that name. If the recognition response has a low confidence, the system may play the response back to the caller (e.g., using a text to speech system), and ask for confirmation that this was what the caller really said, whilst if the recognition fails completely, the caller may be asked to repeat the input, or transferred to a human operator.

Figure 2:
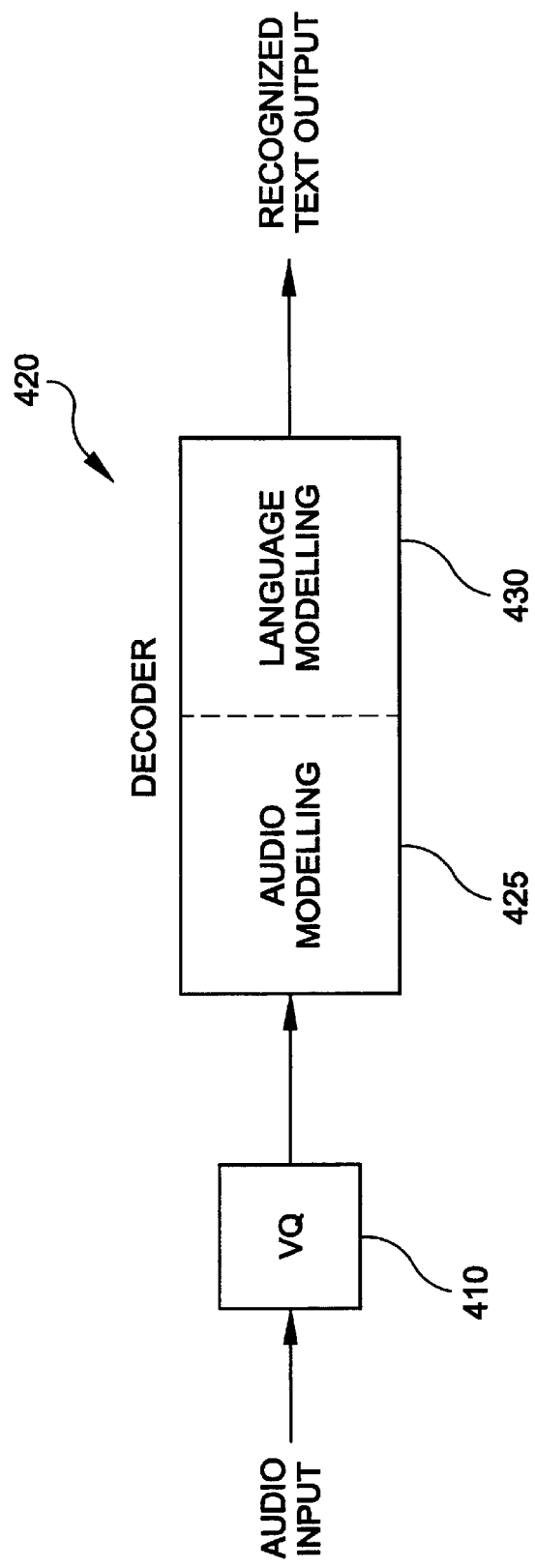
FIG. 2 is a simplified schematic diagram of a voice recognition system.

FIG. 2 illustrates a simple schematic diagram of a typical voice recognition system such as might be used in the voice processing system of FIG. 1. Thus the recognition system receives digitised audio input, which in the case of a telephone signal will generally comprise 8 bit samples at 8 kHz (corresponding to a total data rate of 64 kbit/s). These samples are passed to a vector quantisation unit 410, which aggregates them into vectors of typically 10 ms duration (is 80 samples per vector). The vector quantisation unit may be supplied with a so-called alphabet of vectors (known as labels), and replaces each input vector with the label which matches it most closely. Typically there may be about 200 such labels in the vector quantisation alphabet. (NB Some more complex recognition systems do not in fact perform any vector quantisation, but work with the raw input vectors rather than a limited set of labels).

The audio input, now represented as a sequence of vector labels, is then passed into a decoder unit 420, which is responsible for converting this sequence into recognised text. The decoder functionality can be broken down into two main components, audio modelling 425, and language modelling 430. The purpose of the audio modeller is produce a variety of candidate word strings which may match the input sequence of vector labels; the purpose of the language modeller is then to select which of these word strings is the overall best fit to the audio input.

The mathematical basis for this approach is that if A is the audio input, and W the word output, for a given A, we are seeking to find W such that $P(W|A)$ is maximized. Using Bayes' theorem, this can be re-written as $\max(P(W).P(W|A)/P(A))$, and since $P(A)$ is constant for a given observed A, then the problem becomes the maximisation of $P(W).P(W|A)$. Thus the purpose of the audio modeller is effectively to calculate $P(W|A)$ (the probability of producing the observed audio signal from a given word), and the purpose of the language modeller is effectively to calculate $P(W)$ (the a priori likelihood of a candidate word string produced by the audio modeller). The combination of $P(W|A)$ and $P(W)$ can then be used to determine which candidate word string is most likely to correspond to the speech input on an overall basis.

A language modeller typically looks at the likelihood of particular words appearing next to one another in spoken text, which can be used amongst other things to help decide between homophones (different words sounding the same); "new car" is in general much more likely than "knew car". However, in a telephony context, language modelling is often absent, because systems are generally looking to decode just single words, or constrained sequences of words (e.g., numerals). In most telephony applications the recognition system must actually interpret the input (i.e., understand it enough to follow an appropriate course of action), rather than simply turn it into text, as for example in a dictation system. Clearly it is much easier for the system to interpret single word or short inputs, rather than trying to unravel a complete input sentence. Therefore, most telephony applications make use of menu hierarchies, so that the context of any user response is readily apparent.

Thus the present invention is concerned mainly with the audio (or acoustic) modeller 425, which can be used to match input audio data in the form of a label sequence against a constrained (i.e., predetermined) set vocabulary.

Figure 3:
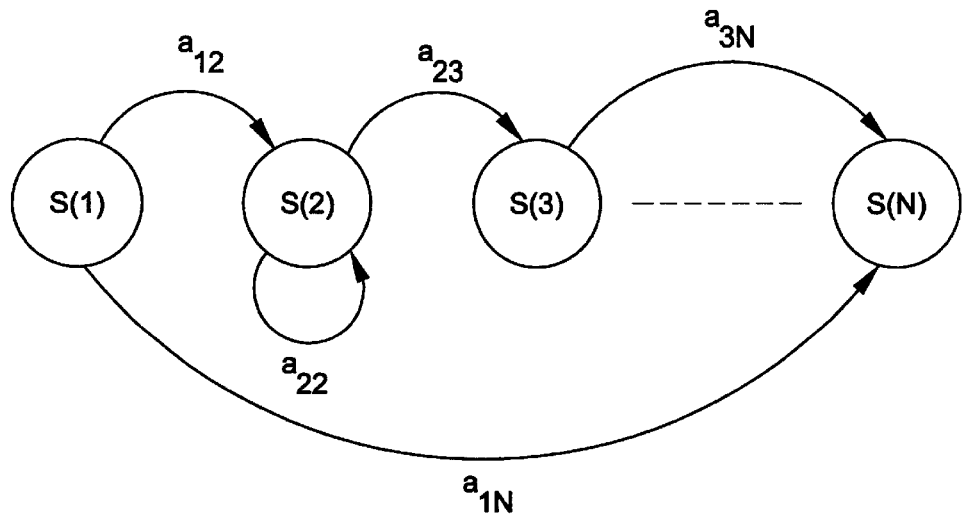
FIGS. 3 and 4 are schematic diagrams of Hidden Markov Models (HMMS)

Modern acoustic modelling is based on Hidden Markov Models (HMMs). An HMM has a number of states, which it transfers between in a statistically determined fashion. FIG. 3 gives an example of a simple HMM having N states, (S(1), S(2), . . . S(N)). The probability of transferring from one particular state to another particular state can be specified in an N by N matrix (generally denominated as A), in which element $a_{ij}$ represents the probability of transferring from state i to state j.

FIG. 3 illustrates how the values of $a_{ij}$ are associated with transitions between states (note that FIG. 3 only shows a subset of the possible transitions). For the HMMs normally used in speech recognition, $a_{ij}=0$ for $j<i$, and it may be additionally specified that the model is initially in state S(1). In terms of FIG. 3, this implies that the model starts on the far left, and state transitions only proceed from left to right; there are no state transitions which operate in the reverse direction. It is common however, for models to permit self-transitions to occur, i.e., a transition which starts and ends at the same node. Thus $a_{ij}$ may be non-zero. An example of a self-transition is shown for S(2) in FIG. 3.

In a "hidden" Markov model, the state transitions cannot be directly observed. Instead the model produces a series of outputs or observations, $(O_1, O_2, \ldots O_i, \ldots)$. Like the state transitions, the outputs are also produced in a statistically determined fashion, and follow a probability distribution B(O), where B generally depends only on the current state of the model. The output probability distribution for state S(i) can therefore be written as $B_{s(i)}$ (O), with B now being used to represent the set of $B_{s(i)}$ (O) for all states. Note that B may represent either a discrete probability distribution, in which case there is a fixed set of possible outputs, or alternatively B may represent a continuous probability distribution.

An HMM is therefore specified by N, the number of states, A, the transition probability matrix, B, the set of output probabilities, plus a parameter $\pi_{s(i)}$, which represents the probability that the HMM is initially in state S(i). In speech applications it is commonly specified that the HMM initially starts in state S(1), in other words, $\pi_{s(i)}=1$ for i=1; $\pi_{s(i)}=0$ for i≠1.

Many HMMs are structured so that there are regular transitions, with an output being produced for each transition. In such a model, it is possible to regard the outputs as being actually produced by the transitions. This sort of model often includes the possibility of a zero or null output for a transition.

In a somewhat different type of HMM, the duration in a particular state is controlled by some external (possibly variable) parameter, after which the model transfers to another state (in general this type of HMM does not permit self-transitions). The number of outputs produced whilst in a particular state depends on the duration of stay in that state. This type of HMM has the advantage that it is possible to force an exit from the model within a finite time (useful for modeling real-life processes); otherwise, an HMM theoretically may never exit from a state for which self-transitions are allowed (thus in the example of FIG. 1, the model may get stuck in state S(2)).

Further details about HMMs, particularly in speech applications, can be found in "A tutorial on Hidden Markov Models and Selected Applications in Speech Recognition" by T. Rabiner, p. 257–286, Proceedings of the IEEE, Vol. 77, Number 2, February 1989; "Hidden Markov models for automatic speech recognition: theory and application" by S. J. Cox, p. 105–115, British Telecom Technological Journal, Vol. 6, Number 2, April 1988, "Hidden Markov Models for Speech Recognition" by X. Huang, Y. Ariki, and M. Jack, Edinburgh University Press, 1990 (ISBN 0 7486 0162 7), "Speech Recognition—The Future Now", edited by M. Koerner, Prentice Hall, 1996, and "Statistical Methods for Speech Recognition" by F. Jelinek, MIT Press, 1997.

Figure 4:
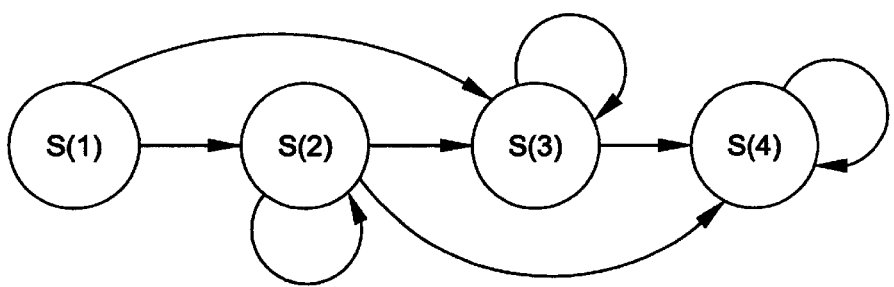

If we now consider the use of HMMs in more detail, FIG. 4 illustrates an example of an HMM which has four states. States 1 and 4 are only capable of producing a single output, which can be designated Z, and which we can equate with silence. States 2 and 3 are each capable of producing two different outputs, which can be designated X and Y. The model only supports left-to-right (plus self) transitions, so that in order to produce a meaningful (i.e., non-silent) output, which we will presume is bounded by silence, the model must start in state 1 and terminate in state 4.

We will discuss the HMM of FIG. 4 with reference to two different sets of A and B matrices (i.e., transition and output probabilities), which will be referred to as Model 1 and Model 2. The assumed values of the A and B matrices for these two models are:

Model 1:

$$A = \begin{pmatrix} 0 & \frac{1}{3} & \frac{2}{3} & 0 \\ 0 & \frac{1}{2} & \frac{1}{4} & \frac{1}{4} \\ 0 & 0 & \frac{3}{4} & \frac{1}{4} \\ 0 & 0 & 0 & 1 \end{pmatrix} \quad B = \begin{pmatrix} \frac{2}{3} & \frac{1}{3} \\ \frac{1}{3} & \frac{2}{3} \end{pmatrix}$$

Model 2:

$$A = \begin{pmatrix} 0 & \frac{3}{4} & \frac{1}{4} & 0 \\ 0 & \frac{1}{3} & \frac{1}{3} & \frac{1}{3} \\ 0 & 0 & \frac{1}{4} & \frac{3}{4} \\ 0 & 0 & 0 & 1 \end{pmatrix} \quad B = \begin{pmatrix} \frac{1}{2} & \frac{3}{4} \\ \frac{1}{2} & \frac{1}{4} \end{pmatrix}$$

where for the B matrices, the columns represent states 2 and 3 respectively, and the top and bottom rows represent outputs X and Y respectively (so that for example the top left value represents the probability of getting output X in state 2).

Now let us assume that we observe an output ZXXZ (from now on we will simply assume the initial and final "Z"s, and simply designate this as "XX"). There are three different routes through the HMM that can produce this output. Listed below are the different routes with their corresponding probabilities for each of the routes in the two different models:

Model 1:

$$R1 \; 1 \to 2 \to 2 \to 4 : \left(\frac{1}{3} \times \frac{2}{3}\right) \times \left(\frac{1}{2} \times \frac{2}{3}\right) \times \frac{1}{4} = \frac{1}{54}$$

$$R2 \; 1 \to 2 \to 3 \to 4 : \left(\frac{1}{3} \times \frac{2}{3}\right) \times \left(\frac{1}{4} \times \frac{1}{3}\right) \times \frac{1}{4} = \frac{1}{162}$$

$$R3 \; 1 \to 3 \to 3 \to 4 : \left(\frac{2}{3} \times \frac{1}{3}\right) \times \left(\frac{3}{4} \times \frac{1}{3}\right) \times \frac{1}{4} = \frac{1}{72}$$

Model 2:

$$R1 \; 1 \to 2 \to 2 \to 4 : \left(\frac{3}{4} \times \frac{1}{2}\right) \times \left(\frac{1}{3} \times \frac{1}{2}\right) \times \frac{1}{3} = \frac{1}{48}$$

$$R2 \; 1 \to 2 \to 3 \to 4 : \left(\frac{3}{4} \times \frac{1}{2}\right) \times \left(\frac{1}{3} \times \frac{3}{4}\right) \times \frac{3}{4} = \frac{9}{128}$$

$$R3 \; 1 \to 3 \to 3 \to 4 : \left(\frac{1}{4} \times \frac{1}{2}\right) \times \left(\frac{1}{4} \times \frac{3}{4}\right) \times \frac{3}{4} = \frac{9}{512}$$

Note that the probabilities are simply obtained by sequentially multiplying together, for each output in turn, the probability of arriving at a new state (from the specified previous state) and the probability of the new state producing the specified output, assuming that all the probabilities are independent of one another.

The above example can be used to illustrate some of the calculations typically performed with HMMs. Thus one common question is given a particular HMM and output, what is the most probable state sequence that produced this output. In the above example, we can see that for Model 1, the output XX was most probably produced by Route 1

(1–2–2–4), whereas for Model 2, the output XX was most probably produced by Route 2 (1–2–3–4). Another question is what is the overall probability that a particular output was produced by a particular HMM. In the above example we can see that the probability that output XX is produced in Model 1 is 25/648 (≈0.0386), whereas the probability that the output XX is produced in Model 2 is 167/1536 (≈0.109).

The probability calculations outlined above can be used in the audio modeller of FIG. 2 to discriminate between different candidate words in a speech recognition system. For example, U.S. Re-issue No. 33,597 describes a recognition system in which an HMM is used to recognise a limited set of individual words (such as the digits from "one" to "nine"). An HMM model having 5 states is provided for each word in the set, each HMM model being associated with one digit to be recognised. The audio signals for each digit are represented as successive audio vectors, with a set of 64 possible different audio vectors. Thus for each state, the B matrix contains the output probabilities for all of these 64 different vectors (of course, some vectors may perhaps have zero output probability from some states). For each model (i.e., for each digit), the state sequence most likely to produce the sequence of audio vectors is determined, along with its corresponding probability. This is analogous to selecting Route 1 from Model 1 and Route 2 for Model 2 for the output XX in the example described above. Note that there are well-known algorithms available for performing this calculation quickly and efficiently. This results in a set of probabilities, one probability for each possible digit/model, representing the probability of the most likely sequence through that model to produce the specified output. The system then identifies the spoken word with the digit/model which has the highest associated probability.

Often in such a recognition process, in order to improve calculation efficiency, a threshold probability is set, and if the probability for a particular path falls at any stage below this threshold, then the path is discarded before completion.

It will be appreciated that although HMM recognition systems are designed to be capable of handling some variation in the pronunciation of a given word, in general it is considered that too large a variation reduces the recognition performance. Thus in a system which has a separate HMM for each word to be identified, it is often common to have separate models for significantly different pronunciations. For example, EP 642117 suggests using two models to handle the different pronunciations of "either".

Before an HMM can be used, it is necessary to derive the A and B probabilities, a process known as training the HMM. This can be illustrated using the HMM of FIG. 4 again, in which the HMM is trained to recognise a single isolated word. In order to do this, multiple recordings of the same word are collected, generally rendered by different speakers. If we represent each recording by a sequence of "X"s and "Y"s (an extreme form of vector quantisation, which of course is technically unrealistic, but which does serve for illustrative purposes), for a set of five different recordings, we may have the following: XX, YXX, XX, XXX, YXX. The purpose of training is to select the A and B probabilities that are most likely to give this overall set of outputs. This cannot be done analytically, but rather an iterative approximation method must be used. Conceptually the process starts with a pair of sets of trial values for A and B, and determines which set of the pair is less likely to produce overall the observed outputs. This set of values is then discarded, and replaced by a new trial set. There are formal strategies available for selecting this new trial set in order to follow an optimisation process. The pair comparison process then repeats until convergence, i.e., no new trial values can be found which improve the likelihood of producing the observed training outputs.

The comparison of a trial pair of models can be appreciated with reference to the example of FIG. 4, in which the output probabilities for XX according to two different models having different A and B distributions were calculated. It is clear that Model 2 is more likely than Model 1 to produce the observation sequence XX. For training, the overall probability of Model 1 and Model 2 producing all five training recordings would be calculated (i.e., not only the output XX, but also YXX and XXX, taking into account their relative frequencies), with the model having the highest overall probability being preferred.

In practical speech recognition systems, a variety of HMM structures can be used, for example one relatively simple HM per word, one composite HMM per specified set of words, one HMM per phoneme, and so on. Further details about training HMMs can be found in U.S. Pat. No. 5,193,142, as well as most of the previously cited references (see especially the paper by Rabiner et al.). Note that for a system designed to recognise a particular limited vocabulary (e.g., digits), it is desirable to try to select the A and B distributions not only to maximise recognition of a single word, but also to optimise discrimination between different words in the vocabulary.

Prior art speech recognition systems have concentrated almost exclusively on determining, essentially in text form, what has been said to them. However, this throws away much of the additional information that accompanies the pure text, to which the human ear is otherwise sensitive, in particular, the emotion of the speaker. (As an analogy, consider the loss when a word processing document is reduced into simple ASCII format). In particular, a speaker may be confused, confident, angry, and so on, and the manner in which they make a particular statement may affect the listener's reaction to it as much as the literal content of the statement.

The speech recognition system of the present invention therefore does not discard this additional manner information, but rather attempts to utilise it to provide increased intelligence in terms of system operation. In the preferred embodiment of a voice processing environment, the following are examples of the use of such a facility:

(a) a caller is asked for an account number—if stated confidently the system proceeds to ask for a password, if stated hesitatingly, the caller is asked to confirm the recognised account number;

(b) a caller is asked if they want travel insurance when making a particular travel booking—if rejected confidently, the system proceeds to another matter, if rejected hesitatingly, the caller is reminded of the benefits of such insurance, to give them an opportunity to reconsider; and (c) a call queuing system asks a caller if they would like to hear information about any particular topic whilst waiting for an operator to become available—if rejected quietly, the system maintains them in their queue position, if rejected angrily, the system detects annoyance, and increases their priority within the queue.

Thus many prior art voice processing systems by default ask for all users to confirm information, which slows down call processing and can become irritating, whereas a human operator might seek such confirmation only in particular circumstances, typically where the caller has been difficult to understand, or where the caller has seemed uncertain. It will be appreciated that some prior art systems already address the former situation, in that their processing may depend on the accuracy confidence level of the recognition result, but hitherto systems have not been able to handle the latter situation. In accordance with the present invention, such uncertainty is now detected, so that the voice application need only seek confirmation in appropriate circumstances dependent on the detected manner of the caller.

This additional functionality is implemented in the preferred embodiment by appropriate training of the HMM (see below). This then results in different HMM paths (or possibly actual different HMMs, dependent on the recognition structure being used) for the same word, according to the manner in which the word was spoken. In other words, the output returned by the HMM for a given piece of audio data indicates not only recognised text, but also discriminates between the manner or tone in which it was said. For example, the HMM may return a first token if the word "No" was said in a conventional, confident manner, and a second token if the word "No" was said in a confused or hesitating manner. The information returned by the HMM can then be used by the calling application to determine how to proceed with the caller, in other words, to control navigation through the application.

Note that the HMM may also return a confidence level associated with the recognised text and manner (e.g., by returning a token and corresponding confidence level). The calling application may also use this confidence level to determine how to proceed with the caller (typically the caller may be asked to confirm recognition results having a low confidence level).

Figure 5:
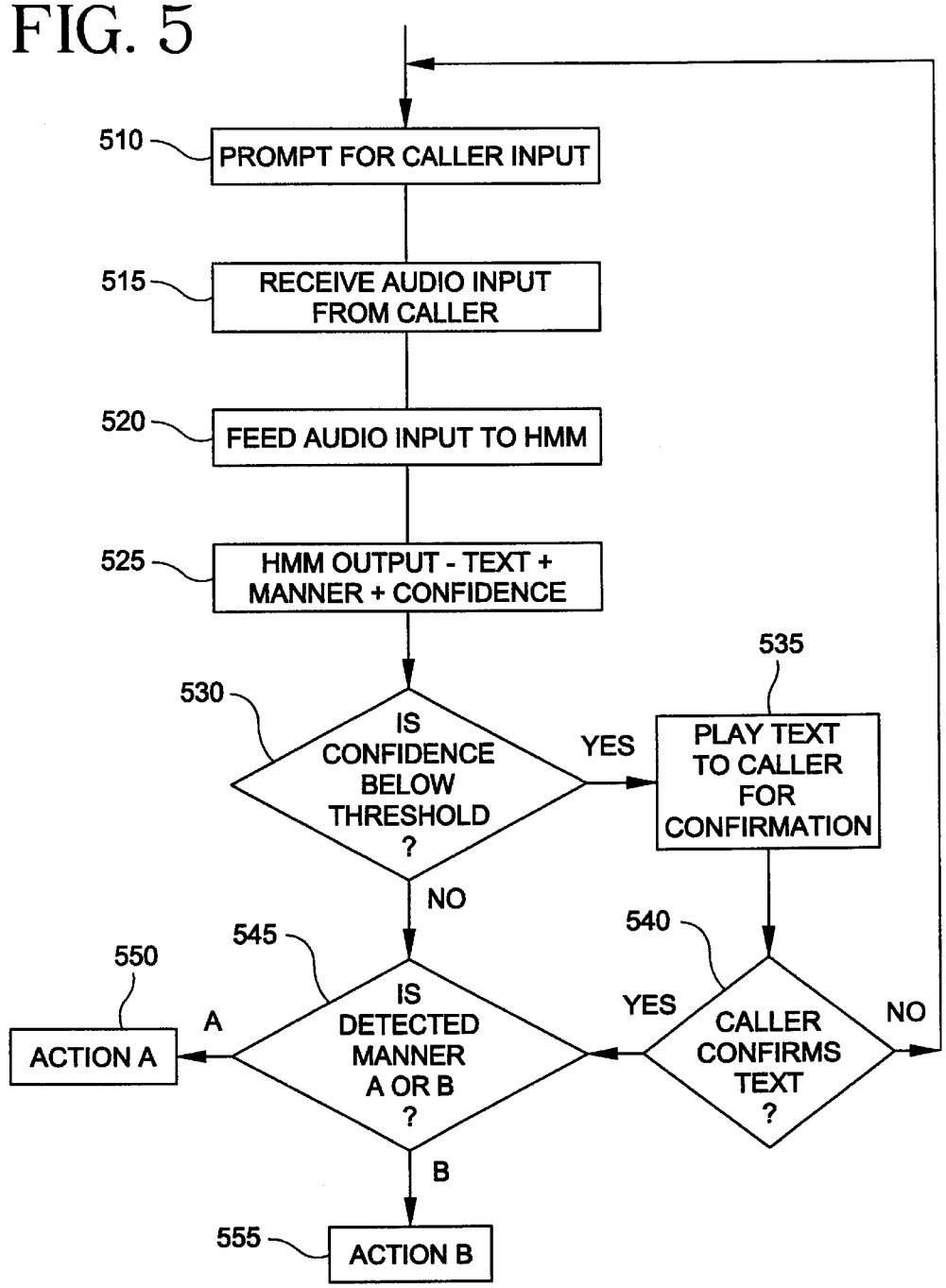
FIG. 5 is a flow-chart illustrating operation of a preferred embodiment of the present invention.

The above operation of the HMM in accordance with a preferred embodiment of the present invention is illustrated in flow chart form in FIG. 5, which depicts the processing performed by a voice processing system in conjunction with a speech recognition system, such as shown in FIG. 1. Thus initially the system plays a prompt to a caller (step 510), which results in the receipt of spoken input from the caller (step 515). This audio input is then passed to the HMM recognition engine (step 520), which based on the best matching HMM model or path, returns the corresponding text and manner, along with a confidence estimate of how likely this match is to be correct (step 525). If the confidence estimate is below a set threshold (step 530), the recognised text is played back to the caller for confirmation (step 535). If the caller does not confirm the text (step 540), then the initial prompt is re-played to the caller. Similarly, note that if the recognition of step 525 fails completely to produce an output (not shown), the system can return directly to step 510 and re-play the prompt to the caller, or can transfer the caller to a human operator (not shown).

Assuming that the confidence level returned is satisfactory (step 530), or the caller confirms the text (step 535), the system then analyses the manner returned by the HMM. In FIG. 5, it is assumed that there are two possible values for this manner, denoted A and B. Based on the detected value of the manner, the system then performs further processing as appropriate, illustrated generically in FIG. 5 as Action A and Action B (step 550, 555). Examples of possible further actions include playing one of a set of different prompts to a caller, transferring to a human agent, terminating the call, and so on.

Note that in practice of course the additional processing will depend not only on the recognised manner, but also on the recognised text. Thus one can imagine Actions A and B as both including a set of actions corresponding to the different possible recognition texts, with the manner being used as a switch to control which particular action or set of actions is invoked for a given caller input.

The initial training of the HMM is accomplished by obtaining a corpus of training data, comprising a set of audio recordings for each word/manner combination to be recognised. The number of recordings in each set should be quite large (e.g., 800+), by different speakers. Also the recordings should be made in the same environment as intended application in order to minimise the effect any distortions; thus for use in a telephony system, recordings should be made over the telephone. Each recording is associated with a token, representing the spoken word and manner.

One way to produce the different manners is to use actors to mimic certain types of delivery (e.g., to speak confidently). However, it is probably more accurate, if more time-consuming, to use real data from callers for this process. In other words, a call centre application can be set up initially without manner discrimination, but after a sufficient volume of calls have been processed, these can be examined (many call centres now record calls) to see if there are any particular stages at which manner discrimination would be useful. The collected responses at these stages can then be labelled and used for the HMM training process, and the application can then be modified accordingly to exploit this additional sensitivity to the manner in which a caller input is spoken.

An important advantage of the invention is therefore that it does not require any changes to the base HMM or recognition system, and so is compatible with existing equipment. Rather, it is a question of training the HMM to discriminate between user inputs in a more sophisticated manner, and then programming the user application to respond accordingly.

The system described so far has been based on a discrete HMM with vector quantisation. In other words, each frame is approximated by one of a fixed set of possible audio vectors. In general however, as mentioned earlier, it has been found preferable to use HMMs with continuous probabilities for speech applications. In such an HMM, the output distribution B for each state is continuous, and so can be used directly to calculate the probability of any input frame. This calculation is normally performed on a set of features, typically LPC coefficients which are extracted from an audio frame. Usually the B distribution for each feature or parameter is assumed to be Gaussian, with specified mean and variance, although more complicated distributions (often mixtures) can also be used. Therefore the B matrix specifies the distribution parameters (e.g., mean and variance) for each of the features in an audio vector, for each state. The output probability is then determined directly for any input audio frame, by determining how similar its parameters (e.g., LPC coefficients) are to the mean values for that particular state. Note that the remainder of the recognition process is essentially the same for both continuous and discrete probabilities.

HMM recognition systems with continuous output probability distributions are described for example in EP 560378 and in "Recognition of Isolated Digits Using Hidden Markov Models with Continuous Mixture Densities" by L. Rabiner, B. Juang, S. Levinson, and M. Sondhi, p. 1211–1234, AT&T Technical Journal, Vol. 64, No. 6, July–August 1985.

Furthermore, although the speech recognition described herein has used an HMM engine to discriminate manner, it may be feasible to use a different mechanism to do this, based on other vocalisation parameters. For example, an increased response duration might indicate hesitation, or increased volume might indicate growing frustration.

In addition, although the speech recognition system of the present invention has been described in terms of a telephony environment, it is not so limited. For example, it might be included in an automatic kiosk which provides local information in response to spoken input questions, or an in-car navigation and control unit. It will therefore be recognised that the system of the present invention may find utility in a great variety of speech recognition applications.

What is claimed is:

1. A method of performing speech recognition comprising the steps of:

receiving acoustic spoken input;

processing said acoustic input by performing speech recognition to determine (i) a text equivalent; and (ii) a manner in which said spoken input was rendered; and performing a further operation, dependent on the manner in which said spoken input was rendered.

2. The method of claim 1, wherein there is a predetermined set of available manners, and said processing step determines which manner from said predetermined set of available manners best corresponds to the manner in which said spoken input was rendered.

3. The method of claim 2, wherein said processing step is performed using a Hidden Markov Model (HMM) which has been trained on said predetermined set of available manners.

4. The method of claim 3 wherein said spoken input is received over a telephone connection.

5. The method of claim 4, wherein said spoken input is received as part of a voice processing operation, and said step of performing a further operation, dependent on the manner in which said spoken input was rendered, comprises moving to a different part of a voice processing menu hierarchy, dependent on the manner in which said spoken input was rendered.

6. The method of claim 5, wherein said spoken input comprises a single word.

7. The method of claim 6, wherein said processing step further comprises determining a confidence level associated with the recognition of the text equivalent.

8. The method of claim 1 wherein said spoken input is received over a telephone connection.

9. The method of claim 1, wherein said spoken input comprises a single word.

10. The method of claim 9, wherein said processing step further comprises determining a confidence level associated with the recognition of the text equivalent.

11. The method of claim 1, wherein said processing step further comprises determining a confidence level associated with the recognition of the text equivalent.

12. A speech recognition system comprising:

means for receiving an acoustic spoken input;

means for processing said acoustic input by performing speech recognition to determine (i) a text equivalent; and (ii) a manner in which said spoken input was rendered; and means for performing a further operation, dependent on the manner in which said spoken input was rendered.

13. The system of claim 12, wherein there is a predetermined set of available manners, and it is determined which manner from said predetermined set of available manners best corresponds to the manner in which said spoken input was rendered.

14. The system of claim 13, wherein said processing means includes a Hidden Markov Model (HMM) which has been trained on said predetermined set of available manners.

15. The system of claim 14, wherein said spoken input comprises a single word.

16. The system of claim 15, wherein said processing means further determines a confidence level associated with the recognition of the text equivalent.

17. The system of claim 12, wherein said processing means further determines a confidence level associated with the recognition of the text equivalent.

18. A voice processing system, comprising:

a speech recognition system, comprising:

means for receiving an acoustic spoken input;

means for processing said acoustic input by performing speech recognition to determine (i) a text equivalent; and (ii) a manner in which said spoken input was rendered; and means for performing a further operation, dependent on the manner in which said spoken input was rendered;

wherein said voice processing system is connected to a telephone network, and said spoken input is received over the telephone network.

19. The voice processing system of claim 18, wherein said performing means comprises a voice processing application running on the voice processing system which moves to a different part of a voice processing menu hierarchy, dependent on the manner in which said spoken input was rendered.

20. A method of training a speech recognition system including a Hidden Markov Model (HMM) comprising the steps of:

collecting samples of acoustic spoken input data of a particular text;

marking for each sample the manner in which the text was spoken; and training the HMM to discriminate acoustic spoken input data according to the manner in which it is spoken.

21. A method of performing speech recognition comprising the steps of:

receiving acoustic spoken input;

processing said acoustic input by performing speech recognition, in accordance with at least a portion of the acoustic spoken input and two or more acoustic models, to determine: (i) a text equivalent; and (ii) an emotional manner in which said spoken input was rendered, wherein the acoustic characteristic of each model is representative of substantially the same text equivalent; and performing a further operation, dependent on the manner in which said spoken input was rendered.

22. A speech recognition system comprising:

means for receiving acoustic spoken input;

means for processing said acoustic input by performing speech recognition, in accordance with at least a portion of the acoustic spoken input and two or more acoustic models, to determine: (i) a text equivalent; and (ii) an emotional manner in which said spoken input was rendered, wherein the acoustic characteristic of each model is representative of substantially the same text equivalent; and means for performing a further operation, dependent on the manner in which said spoken input was rendered.

23. A voice processing system, comprising:

a speech recognition system, comprising:

means for receiving an acoustic spoken input;

means for processing said acoustic input by performing speech recognition, in accordance with at least a portion of the acoustic spoken input and two or more acoustic models, to determine: (i) a text equivalent; and (ii) an emotional manner in which said spoken input was rendered, wherein the acoustic characteristic of each model is representative of substantially the same text equivalent; and means for performing a further operation, dependent on the manner in which said spoken input was rendered;

wherein said voice processing system is connected to a telephone network, and said spoken input is received over the telephone network.

24. A method of training a speech recognition system including a Hidden Markov Model (HMM) comprising the steps of:

collecting samples of acoustic spoken input data of a particular text;

marking for each sample the emotional manner in which the text was spoken; and training the HMM to discriminate acoustic spoken input data according to the manner in which it is spoken such that the speech recognition system is capable of outputting a text equivalent of the acoustic spoken input data.

* * * * *